United States Patent [19]

Buchan

[11] 3,713,723
[45] Jan. 30, 1973

[54] INTEGRATED ELECTRO-OPTIC ANALYZER
[75] Inventor: William R. Buchan, Lincoln, Mass.
[73] Assignee: Itek Corporation, Lexington, Mass.
[22] Filed: April 21, 1971
[21] Appl. No.: 135,979

[52] U.S. Cl. ................... 350/150, 350/147, 350/157
[51] Int. Cl. .............................................. G02f 1/26
[58] Field of Search............... 350/147, 150, 157, 160

[56] References Cited

UNITED STATES PATENTS

| 3,383,664 | 5/1968 | Chen et al. | 350/150 |
| 3,449,583 | 6/1969 | Eden | 350/150 |
| 3,517,206 | 6/1970 | Oliver | 350/150 |
| 3,445,826 | 5/1969 | Myers | 350/150 UX |

OTHER PUBLICATIONS

McGraw–Hill Encyclopedia of Science & Technology, Vol. 10 (McGraw–Hill, N.Y., 1960) pp. 452–453.

Primary Examiner—David Schonberg
Assistant Examiner—Paul R. Miller
Attorney—Homer O. Blair, Robert L. Nathans, David E. Brook and Joseph S. Iandiorio

[57] ABSTRACT

An integrated electro-optic birefringent analyzer is disclosed including an electro-optic birefringent medium whose birefringence varies as a function of an associated electric field and a first polarizing medium integrally structured with the electro-optic birefringent medium for detecting the polarization modulation imposed on radiation by the electro-optic birefringent medium.

5 Claims, 5 Drawing Figures

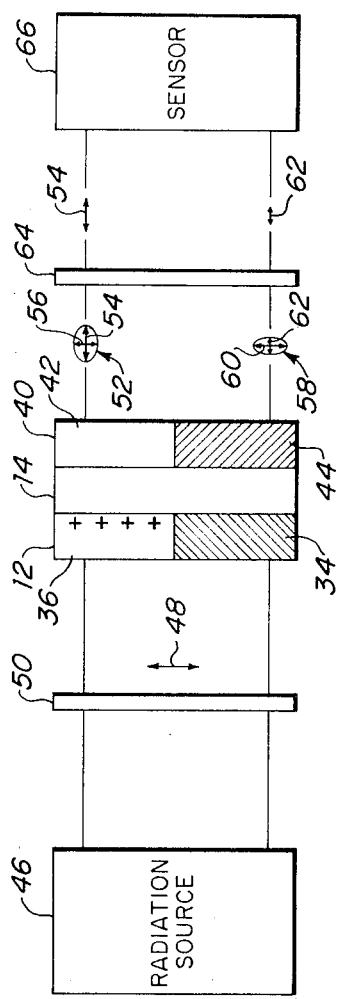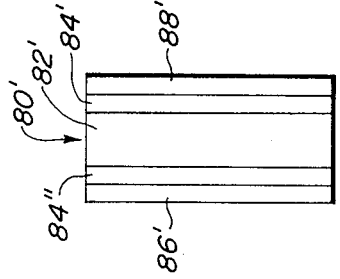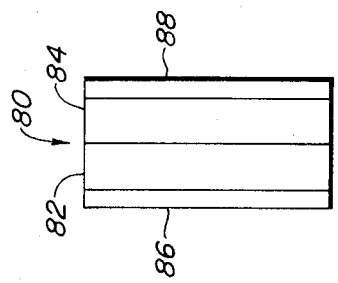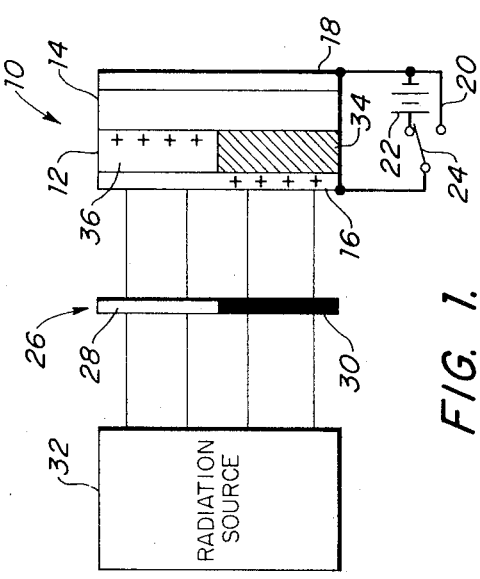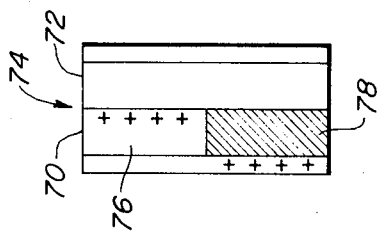
WILLIAM R. BUCHAN
INVENTOR.
BY
*Joseph S. Iandiorio*
ATTORNEY.

INTEGRATED ELECTRO-OPTIC ANALYZER

CHARACTERIZATION OF INVENTION

The invention is characterized in an integrated electro-optic birefringent analyzer including an electro-optic birefringent medium whose birefringence varies as a function of an associated electric field and a first polarizing medium integrally structured with the electro-optic birefringent medium for detecting the polarization modulation imposed on radiation by the electro-optic birefringent medium.

FIELD OF INVENTION

This invention relates to an integrated electro-optic structure for reading out information present in the form of variations in intensity of an electric field.

BACKGROUND OF INVENTION

Recent developments in the field of electro-optic readout apparatus and techniques indicate that information present in the form of variations in the intensity of an electric field may be read out using a medium that exhibits electrically induced birefringence. In such techniques an electro-optic birefringent medium is associated with an information bearing electrical field. Such information bearing fields may be those established by corona discharge on a dielectric material or those present in photoelectrets, or thermoelectrets or in any other form. Readout is accomplished by associating the electro-optic birefringent medium with the electric field so that the electric field is established across the medium, and the medium is exposed to polarized radiation. The birefringence of the medium causes the polarized radiation to become elliptically polarized; the ellipticity is a function of the birefringence of the medium which is in turn a function of the intensity of the electric field. If for example, the medium is exposed to vertically polarized radiation areas of the medium subjected to a low intensity electric field have low induced birefringence and so produce elliptical polarization of the radiation wherein the ellipse is vertically elongated and contains a long vertical component but a small horizontal cross component. In contrast, areas of the medium subjected to a high intensity electric field have high induced birefringence and so produce elliptical polarization of the radiation wherein the ellipse is horizontally elongated and contains a short vertical component and a long horizontal cross component. An analyzer oriented with its plane of polarization parallel to the horizontal plane detects the horizontal components representative of the pattern of variation of the intensity of the electric field. Generally the readout apparatus includes an electro-optic birefringent medium, a source of polarized radiation which may comprise a source of unpolarized radiation plus a polarizing element, and an analyzer which may be a second polarizing element whose polarization axis is crossed relative to the axis of polarization of the input radiation. Such apparatus is usually arranged with its components in spaced relation so that substantial space is required to accommodate the whole apparatus. Further, skilled personnel and special equipment may be required to set up and align such apparatus.

SUMMARY OF INVENTION

It is therefore an object of this invention to provide a small, rugged, simple, compact electro-optic birefringent readout apparatus.

It is a further object of this invention to provide such an apparatus which is preassembled and so needs no special skills or tools to assemble.

It is a further object of this invention to provide such an apparatus which may be used in ordinary optical equipment.

It is a further object of this invention to provide such an apparatus which includes the necessary elements in an integrated structure.

The invention may be accomplished by an integrated electro-optic birefringent analyzer including an electro-optic birefringent medium whose birefringence varies as a function of an associated electric field. A polarizing medium integrally structured with the electro-optic birefringent medium detects the polarization modulation imposed on radiation by the electro-optic birefringent medium.

DISCLOSURE OF PREFERRED EMBODIMENT

Other objects, features and advantages will occur from the following description of a preferred embodiment and the accompanying drawings, in which:

FIG. 1 is a diagram showing a method and apparatus for establishing an information bearing electric field in a device.

FIG. 2 is a diagram showing a method and apparatus for reading out the information present in the electric field in the device of FIG. 1.

FIG. 3 is an alternative form of the device shown in FIGS. 1 and 2.

FIG. 4 is a diagram of an integrated electro-optic birefringent analyzer according to this invention.

FIG. 5 is a diagram of an alternative construction of the integrated electro-optic birefringent analyzer of this invention.

Typically, an information-bearing electric field may be established using a device 10, FIG. 1, including a photoconductor medium, layer 12, and a dielectric medium, layer 14, between a pair of electrodes 16 and 18 which are selectively connected in series with either shorting lead 20 or battery 22 by means of switch 24. Electrode 16 is transparent and electrode 18 may or may not be transparent. Information-bearing transparency 26 having a low density upper portion 28 and a high density lower portion 30 is illuminated by radiation from source 32. The less intense radiation passing through the higher density lower portion 30 of transparency 26 renders section 34 of photoconductive layer 12 slightly conductive and the more intense radiation passing through the lower density upper portion 28 of transparency 26 renders section 36 of photoconductive layer 12 more conductive. Thus with switch 24 connected across battery 22 as shown, the positive charges at electrode 16 pass easily through upper section 36 to the boundary of layer 14 whereas the positive charges proximate the lower section 34 meet greater resistance. If switch 24 is not opened the charge pattern across the device 10 will remain as shown in FIG. 1. Alternatively, switch 24 may be moved to the position in which it connects to lead 20 whereby electrodes 16 and 18 are shorted together. This results in the dissipation of the charges in electrode 16 proximate section 34 so that only the charges in section 36 proximate the boundary of layer 14 remain. The period during which a field, once established, will remain present in device 10 depends upon the relative resistances and capacitances of layers 12 and 14. If the capacitances and resistances of both layers are high, the charge will be stored for a significant period of time which may extend for hours or even days and so device 10 may be used as a storage medium. If the capacitances and resistances of layers 12 and 14 are relatively low then the charge will be dissipated rather quickly and device 10 may be used in real time applications where only momentary presence of the field is necessary.

The information present in the electric field established in device 10 may be read out by associating an electro-optic birefringent medium, layer 40, FIG. 2, with device 10 shown without electrodes 16 and 18. The more intense electric field in section 36 of photoconductor layer 12 results in a greater electrically induced birefringence in upper section 42 of layer 40, and the lower intensity electric field across the lower section 44 of layer 40 results in a lesser degree of birefringence in section 44. Readout may be accomplished using radiation from source 46 polarized in the vertical plane, arrow 48, by a polarizing element 50. The polarized radiation may be circularly polarized instead of plane polarized and element 50 may be eliminated if source 46 supplies the polarized radiation.

The radiation subject to the greater induced birefringence of section 42 produces elliptically polarized radiation, ellipse 52, having a large horizontal cross component 54 and a smaller vertical component 56. Radiation subject to the lesser induced birefringence of section 44 produces elliptically polarized radiation, ellipse 58, having a large vertical component 60 and a small horizontal cross component 62. This elliptical polarization modulation of the radiation may be detected by a crossed polarizer or analyzer 64 which may be a polarizing element similar to element 50 but oriented with its polarization axis orthogonal to that of element 50 as indicated by arrow 48. Analyzer 64 detects only cross components 54 and 62 to produce a pattern at sensor 66 which is a representation of the pattern of information present in transparency 26. The representation resulting from the detection by analyzer 64 is a positive of the information. If analyzer 64 were oriented with its axis of polarization parallel to that of element 50, then the representation detected by it would be a negative. If electro-optic birefringent medium 40 is also a dielectric medium then layer 40 may be substituted for dielectric layer 14 in device 10 so that layer 40 acts as both an electrical blocking layer to permit an electric field to be established in device 10 and subsequently performs as an electro-optic birefringent medium to enable readout of device 10.

Alternatively, both the electro-optic birefringent medium and the photoconductor medium may be embodied in one layer 70 in combination with a dielectric layer 72 in device 74, FIG. 3. Exposure of the photoconductor layer 70 to radiation in the same manner as photoconductor layer 12 was exposed in FIG. 1 results in the same charge distribution as occurs in FIG. 1. Thus the higher intensity radiation incident on upper section 76 of layer 70 causes the charges to penetrate layer 70 to the boundary of dielectric layer 72 more readily than in lower section 78 subject to the less intense radiation. However, in device 74 since layer 70 is both the photoconductor medium and the electro-optic birefringent medium, the penetration of the charges through section 76 results in a less intense electric field across section 76 whereas the lesser penetration of the charges through section 78 results in a stronger field across section 78. Therefore the induced birefringence of section 78 is greater than that of section 76 and the elliptical polarization of radiation transmitted by section 78 is greater than the elliptical polarization of radiation transmitted by section 76.

The radiation used to read out the information present in the electric field by means of the electro-optic medium may be transmitted completely through the medium or may be reflected back through it. The radiation used to expose the photoconductive medium and that used to read out the electro-optic medium need not be visible light.

Serial as well as parallel readout may be performed by scanning the electro-optic medium with a beam of radiation. Similarly, the photoconductor medium may be exposed serially as well as in parallel and the photoconductor medium may be replaced by some other means for applying an electric field to the electro-optic medium such as a dielectric storage tape or a scanning electron beam.

The electro-optic medium may be formed of DKP, DKDP, or lithium niobate, and the photoconductor layer may be formed of amorphous zinc sulfide, zinc selenide, zinc telluride, or cadmium sulfide. Or both the electro-optic birefringent medium and photoconductor medium may be present in a single material such as cubic zinc sulfide, zinc selenide, or zinc telluride, and combined with a dielectric blocking layer such as polystyrene or $SiO_2$.

In accordance with this invention an analyzer such as analyzer 64, FIG. 2, which also has dielectric properties is combined in an integral structure with an electro-optic photoconductor layer to produce a single rugged integrated structure which can serve both as means to support an electric field representative of information and as means for reading out the information present in that electric field.

In one embodiment, device 80, FIG. 4, includes an electro-optic photoconductor medium, layer 82, combined with a dielectric blocking medium, which is also an analyzer for polarized radiation, layer 84. Layer 82 may be, for example, cubic zinc sulfide, and layer 84 may be made of Polaroid sheet polarizer, arranged between two electrodes 86 and 88. During a read in operation device 80 is exposed through electrode 86 to radiation whose intensity varies in a pattern representative of some information. This pattern of radiation intensity causes the photoconductor medium in layer 82 to assume a similar pattern of conductance. An electric field is established in device 80 by the charges moving from electrode 86 through the photoconductor medium in layer 82 in a pattern similar to the conductance pattern established in the photo-conductor medium, layer 82. Dielectric properties of layer 84 function to prevent any charges migrating through the photo-conductor medium of layer 82 from reaching electrode 88, thereby maintaining a charge separation which establishes the electric field in device 80. During readout, when polarized radiation is supplied through electrode 86 to the electro-optic medium of layer 82, that polarized radiation is elliptically polarized by the electro-optic medium of layer 82 to an extent dependent upon the intensity of the electric field across the electro-optic medium of layer 82. The polarizing or analyzing property of layer 84 acts to select one component of the elliptically polarized radiation transmitted by electro-optic layer 82 to detect the modulation introduced to that polarized radiation by the electro-optic medium under influence of the electric field. Thus, in one device 80 there is contained all the necessary elements for reading in and reading out information. The photoconductor medium, the electro-optic medium, the dielectric medium, the analyzing medium and the electrodes are contiguously, compactly formed in an integral structure which is simple, rugged and requires no special aligning techniques of the optical elements for its operation. Further, device 80 may be made suitably shaped and sized to fit in existing optical equipment such as slide projectors and the like.

A similar device 80' is shown in FIG. 5 where like parts have been shown with like reference numerals primed with respect to FIG. 4. In device 80' the electro-optic and photoconductor mediums, layer 82', are arranged between two dielectric polarizing mediums 84' and 84'' within electrodes 86' and 88'. In device 80' electro-optic photoconductor layer 82' may be cubic zinc sulfide and dielectric polarizing layers 84' and 84'' may be formed of Polaroid sheet polarizer material. The use of two dielectric polarizing layers 84', 84'' in device 80' provide two significant advantages. First, it incorporates both the polarizing element such as element 50, FIG. 2, and the analyzing element such as element 64, FIG. 2, in one simple, rugged integrated structure with the electro-optic photoconductor medium. Layer 84'' permits an unpolarized radiation source such as source 46, FIG. 2, to be used to read out the information present in the electro-optic photoconductor layer 82' without the requirement of the usual external polarizing element and layer 84'' does not interfere with the exposing radiation source which initially establishes the electric field in device 80'. Second, the use of a dielectric layer on either side of the electro-optic photoconductor layer permits the electric field to be established across that layer in each of the two possible directions. That is, either electrode 86' or electrode 88' may be connected to the positive terminal of the battery or other energizing source. Previously, when only one dielectric layer was used, it was necessary to connect the positive terminal of the battery 22, FIG. 1, to the electrode 16 adjacent the photoconductor layer and the negative terminal of battery 22 to the electrode adjacent the dielectric layer 14. For example, in the diagram of FIG. 1 if the polarity of battery 22 were reversed the supply of electrons provided at electrode 16 would be injected into the photoconductor material of layer 12 causing it to respond as a typical semiconductor and become conducting so that no meaningful electric field representative of information could be established.

Other embodiments will occur to those skilled in the art and are within the following claims:

What is claimed is:

1. An integrated electro-optic storage device and analyzer comprising:

an electro-optic birefringent medium whose birefringence varies as a function of an associated electric field;

a photoconductor medium whose conductance varies as a function of the intensity of incident radiation thereon;

a first dielectric polarizing medium integrally attached to one face of said electro-optic birefringent medium for detecting the polarization modulation imposed on radiation by said electro-optic medium; and, a second dielectric polarizing medium integrally attached to said photoconductor medium to polarize incident light to said storage and analyzer device.

2. A storage and analyzer device of claim 1 wherein said photoconductor medium and said electro-optic birefringent medium are included in the same material.

3. A storage and analyzer device of claim 1 wherein said photoconductor and said electro-optic birefringent medium are each included in a separate layer of material.

4. A storage and analyzer device of claim 1 further including means to impose an electric field across said device.

5. A storage and analyzer device of claim 4 wherein said means for imposing includes a pair of electrodes spaced on opposite sides of the device, said electrodes being connected to a source of electrical potential.

* * * * *